United States Patent
Koesters

(10) Patent No.: US 10,569,933 B2
(45) Date of Patent: *Feb. 25, 2020

(54) METHOD FOR MANUFACTURING A PLASTIC FABRIC-FILM COMPOSITE PRODUCT, PLASTIC FABRIC-FILM COMPOSITE AND PACKAGING BAG COMPRISING A PLASTIC FABRIC-FILM COMPOSITE

(71) Applicant: MONDI AG, Vienna (AT)

(72) Inventor: Jens Koesters, Wallenhorst (DE)

(73) Assignee: Mondi AG, Vienna (AT)

( * ) Notice: Subject to any disclaimer, the term of this patent is extended or adjusted under 35 U.S.C. 154(b) by 1 day.

This patent is subject to a terminal disclaimer.

(21) Appl. No.: 15/682,751

(22) Filed: Aug. 22, 2017

(65) Prior Publication Data

US 2018/0057215 A1 Mar. 1, 2018

(30) Foreign Application Priority Data

Aug. 30, 2016 (EP) .................................... 16186374

(51) Int. Cl.
*B65D 30/06* (2006.01)
*B32B 5/02* (2006.01)
*B32B 27/32* (2006.01)
*B65D 75/00* (2006.01)
*B32B 27/12* (2006.01)
(Continued)

(52) U.S. Cl.
CPC .......... *B65D 29/04* (2013.01); *B29C 48/0021* (2019.02); *B29C 48/10* (2019.02); *B29C 48/154* (2019.02); *B29C 48/21* (2019.02); *B32B 5/024* (2013.01); *B32B 27/12* (2013.01); *B32B 27/32* (2013.01); *B32B 37/153* (2013.01); *B65D 75/006* (2013.01); *B32B 2305/18* (2013.01);
(Continued)

(58) Field of Classification Search
CPC ...... B65D 29/04; B65D 75/006; B32B 5/024; B32B 27/12; B32B 27/32; B32B 37/153; B32B 2307/5825; B32B 2307/75; B32B 2439/46; B32B 2305/18; B32B 2439/70; B29C 47/0064; B29C 47/0026; B29C 47/025; B29C 47/065
USPC .................................................... 156/244.11
See application file for complete search history.

(56) References Cited

U.S. PATENT DOCUMENTS

| 3,660,150 A | 5/1972 | Cooper |
| 4,039,364 A * | 8/1977 | Rasmussen ........... B29C 43/305 |
| | | 156/164 |

(Continued)

FOREIGN PATENT DOCUMENTS

| DE | 2 027 060 | 12/1970 |
| EP | 2 188 438 | 5/2010 |

(Continued)

*Primary Examiner* — Philip C Tucker
*Assistant Examiner* — Vicki Wu
(74) *Attorney, Agent, or Firm* — Collard & Roe, P.C.

(57) ABSTRACT

A method for manufacturing a plastic fabric-film composite product includes forming an extruded-film web with at least one sealing layer by film extrusion in such a way that the sealing layer is located on a first side of the extruded-film web and then, feeding and laminating a plastic-fabric web made of film-strip fabric and the prefabricated extruded-film strip with one another to form a composite web. The composite web is formed in such a way that a second side of the extruded-film web faces a first side of the plastic-fabric web.

7 Claims, 4 Drawing Sheets

(51) Int. Cl.
- *B32B 37/15* (2006.01)
- *B29C 48/10* (2019.01)
- *B29C 48/154* (2019.01)
- *B29C 48/21* (2019.01)
- *B29C 48/00* (2019.01)

(52) U.S. Cl.
CPC ... *B32B 2307/5825* (2013.01); *B32B 2307/75* (2013.01); *B32B 2439/46* (2013.01); *B32B 2439/70* (2013.01)

(56) References Cited

U.S. PATENT DOCUMENTS

| | | | |
|---|---|---|---|
| 4,373,979 A | 2/1983 | Planeta | |
| 7,976,925 B2 * | 7/2011 | Rasmussen | B29C 47/065 156/163 |
| 9,067,364 B2 | 6/2015 | Fuerst et al. | |
| 2011/0003099 A1 * | 1/2011 | Vinck | B32B 27/32 428/34.9 |
| 2013/0040084 A1 * | 2/2013 | Han | B65D 29/02 428/35.4 |
| 2016/0176579 A1 * | 6/2016 | Brauer | B65D 29/00 383/10 |
| 2016/0304239 A1 * | 10/2016 | Koesters | B65D 17/464 |

FOREIGN PATENT DOCUMENTS

| | | | |
|---|---|---|---|
| KR | 2008000964 A * | 1/2008 | |
| WO | 95/30598 | 11/1995 | |
| WO | 2001/05671 | 1/2001 | |
| WO | 2003/074264 | 9/2003 | |
| WO | WO-2009033197 A1 * | 3/2009 | B65D 31/02 |
| WO | 2013/123015 | 8/2013 | |

* cited by examiner

METHOD FOR MANUFACTURING A PLASTIC FABRIC-FILM COMPOSITE PRODUCT, PLASTIC FABRIC-FILM COMPOSITE AND PACKAGING BAG COMPRISING A PLASTIC FABRIC-FILM COMPOSITE

CROSS-REFERENCE TO A RELATED APPLICATION

The invention described and claimed hereinbelow is also described in European Patent Application EP 16 186 374.1, filed on Aug. 30, 2016. The European Patent Application, the subject matter of which is incorporated herein by reference, provides the basis for a claim of priority of invention under 35 U.S.C. 119(a)-(d).

BACKGROUND OF THE INVENTION

The invention relates to a method for manufacturing a plastic fabric-film composite product, a plastic fabric-film composite and a packaging bag comprising the plastic fabric-film composite.

Plastic fabric composite bags are suitable, in particular, for large containers having a substantial fill volume and a substantial fill weight. As a result of individual, mutually intersecting strips of the film-strip fabric, very large loads can be accommodated by known plastic fabric composite bags. Even in the event of local damage to the plastic fabric or the plastic fabric-film composite, further tearing can be prevented by use of the individual, perpendicularly interwoven strips.

The stability of plastic fabric composite bags also is enhanced by way of the strips, which are usually formed from polypropylene, being stretched, wherein the crosswise arrangement of the individual strips in a weaving process results in the formation of a material which is stable in all directions.

Simple, uncoated packaging bags comprising a plastic strip fabric can be utilized, for example, for the packaging of building products, wherein such packaging bags are then generally closed by sewing or bonding, because the film-strip fabric formed from a thermoplastic plastic cannot be easily heat-sealed.

For challenging packaging's, it is known from WO 2009/033197 A1, for example, to provide the plastic-strip fabric with a cover film which is located on the outside on packaging bags to be formed and is imprinted on its side facing the film-strip fabric, wherein the imprint is then visible through the cover film.

Such a packaging bag combines, to a certain extent, the advantages of a simple fabric bag comprising a film-strip fabric, on the one hand, with the advantages of a film bag, on the other hand. By use of the combination described, a very high load-bearing strength and tear resistance is achieved, while the cover film on the outside of the bag ensures a tight closure and a high-quality appearance.

In the case of such a bag, however, a disadvantage can result whereby the film-strip fabric situated on the inner side is not heat-sealable without any further measures and, therefore, it is difficult to close the packaging bag. Moreover, liquids from the interior of the bag can penetrate at least into the film-strip fabric.

To design the described packaging bag comprising a plastic fabric-film composite to be heat-sealable, it is provided according to EP 2 188 438 B1, WO 95/30598 A1, and DE 2 027 060 A, to provide the film-strip fabric with a molten coating that is then arranged on an inner side of a packaging bag and makes it possible to produce heat-sealed seams there. The molten plastic is extruded onto the film-strip fabric for this purpose. In this case, an advantage also results in that the molten plastic can penetrate intermediate spaces of the film-strip fabric, whereby a particularly reliable and intimate connection of the composite is achieved.

The plastic coating is selected in such a way that the melting and softening temperature lies substantially below the corresponding temperatures of the film-strip fabric, so that the stability of the stretched film strips is not adversely affected by the coating or by a subsequent sealing procedure. Consequently, the material selection for the heat-sealable plastic coating is extremely limited.

Another type of closure of a film bag is known that allows for mitting such a coating. For example, the packaging bag formed from a film-strip fabric can be turned inside-out and can be closed with the aid of adhesive or an adhesive strip. An embodiment of this type is known from WO 01/05671 A1.

In addition to a closure utilizing hot-melt adhesive according to U.S. Pat. No. 4,373,979, simple sewing is also an option.

According to WO 2013/123015 A1, a stepped trimming also can be provided on an upper edge and on a lower edge of the packaging bag, so that the doubled-over ends are more easily closed, for which, for example, a connection by ultrasonic welding and/or hot air can be considered.

A plastic-fabric composite bag is known from US 2013/0040084 A1, which comprises on its inner side a barrier layer that is applied onto the film-strip fabric with the aid of adhesive.

WO 03/074264 relates to a cross-laminate, which comprises two that are adhered to each other. The films themselves each comprise a layer formed from strands situated in parallel to each other.

SUMMARY OF THE INVENTION

The present invention overcomes the shortcomings of known arts, such as those mentioned above.

To that end, the invention provides a method for manufacturing an improved plastic fabric-film composite product. The invention also provides for forming heat-sealed seams on the plastic fabric-film composite product, wherein an adaptation with respect to the functional properties is also an objective. Moreover, a plastic fabric-film composite as well as a packaging bag comprising a plastic fabric-film composite are also provided, according to the invention.

In an embodiment, the invention provides a method for manufacturing a plastic fabric-film composite product, wherein an extruded-film web comprising at least one sealing layer is formed by film extrusion in such a way that a sealing layer is located on a first side of the extruded-film web, and wherein a plastic-fabric web comprising a film-strip fabric and the prefabricated extruded-film strip are fed and laminated with one another in order to form a composite web in such a way that a second side of the extruded-film web faces a first side of the plastic-fabric web.

The sealing layer advantageously has a lower melting and softening temperature than the strip fabric. The sealing layer is sealed through the strip fabric without said strip fabric melting and preferably also without said strip fabric losing its strength by way of softening. The sealing layer can be folded onto itself and sealed to itself. Depending on the design, the sealing layer is selected in such a way that it is also heat-sealable against another film layer, for example, an additional cover film. Reclosure elements are sealed on the film layer or on an inner side of the finished packaging bag.

As is known from the prior art, a sealing layer is produced on a plastic-fabric web comprising a film-strip fabric, which sealing layer is then situated on the inner side in the subsequent production of a packaging bag. In the inventive plastic fabric-film composite product, however, an extruded film is first produced for this purpose in a separate method step by film extrusion, where the extruded film is then laminated extrusion-laminated, with the plastic-fabric web to form a prefabricated extruded-film web.

An additional amount of effort for the separate method step of a film extrusion is intentionally put up with in this context. In this context, the invention is based in part on the finding that the properties of the plastic fabric-film composite can be optimized by use of an extruded-film web.

Since a prefabricated extruded-film web is fed and laminated within the scope of the invention, a smooth surface is produced on the side formed by the sealing layer, because the prefabricated extruded-film web, in contrast to a layer applied via lamination, is not molten and so cannot flow. Due to the provision of a completely smooth, flat sealing layer as a component of the extruded-film web, a subsequent heat-sealing process can be simplified. In the event of a slight temperature increase, in particular, a connection that is reliable and covers the entire surface along sealing jaws is easily achieved, while insufficient connection points can result in the case of a less uniform surface structure.

The extruded-film web is preferably extruded by blown-film extrusion, and so a blown-film web is therefore present.

In addition, the extruded-film web also can be readily coextruded in multiple layers, which makes it possible to integrate further functional layers into the extruded-film web.

An at least three-layered design is preferred, in which case the sealing layer, which is finally situated on the outside in the composite, adjoins a functional layer via a primer layer. Within the scope of the invention, a barrier layer can be integrated into the extruded-film web, for example.

Due to the process of film extrusion, which is provided separately upstream, a suitable layer sequence comprising highly diverse materials is largely freely selected, wherein good mechanical properties are achieved by the film-extrusion process.

Possible options for the material for a barrier layer are, for example, ethylene-vinyl alcohol copolymer (EVOH), polyamide (PA), and polyethylene terephthalate (PET).

The sealing layer is formed based on polyolefin, in particular polyethylene (PE). The sealing layer and the functional layer are advantageously connected to each other by a suitable primer layer. Proceeding from the sealing layer, the layer sequences listed in the following are possible options, by way of example:

PE/HV/PA,
PE/HV/EVOH,
PE/HV/EVOH/HV/PE,
PE/HV/PA/HYPE,
PE/HV/PA/EVOH/PA/HV/PE.

The barrier layer comprising EVOH can be provided as a gas or odor barrier and is distinguished by a good blocking effect. In addition, EVOH also is an effective barrier against a migration of oils and greases that can be contained, to a large extent, in the contents, specifically in the case of foodstuffs and animal feed.

Polyamides also are suitable as gas or odor barriers or as barriers against oils and greases.

As described above, the prefabricated extruded-film web and the plastic-fabric web are preferably connected to each other by extrusion lamination, for which at least one molten film layer is introduced between the prefabricated extruded-film web and the plastic-fabric web.

The extrusion lamination takes place on a second side of the extruded film, while the sealing layer is located on the first side of the extruded film, and so these therefore form an outer side of the composite web. The extrusion lamination results in the advantage that irregularities in the plastic-fabric web comprising the film-strip fabric are compensated for to a certain extent, because the additional molten plastic that is introduced within the scope of the extrusion lamination can penetrate between the open spaces in the crosswise-arranged film strips. A substantially flat contact area, however, forms on the extruded film.

In the case of extrusion lamination, two or more layers also can be introduced, in a molten state, between the extruded-film web and the plastic-fabric web. For example, a two-layer co-extrusion can be provided in the case of extrusion lamination, wherein a layer of polypropylene is provided in a direction of the strip fabric and a layer of a primer is provided in a direction of the extruded-film web. Homopolymers as copolymers, including random copolymers, and block copolymers, are possible options as the polypropylene. Polyolefin copolymers, polyolefin terpolymers, and functionalized polyolefins, for example, are suitable for use as primers. A MAH-grafted PP is an example of a functionalized polyolefin.

In an embodiment, a prefabricated extruded-film web is laminated onto one side of the plastic-fabric web comprising the film-strip fabric. A cover film is situated on the opposite side of the plastic-fabric web, as is also known from the prior art. Within the scope of the invention, however, this cover film is not necessary to provide for seal integrity during the manufacture of a packaging bag comprising the plastic fabric-film composite. Instead, the cover film is used as a type of decorative film which covers the plastic-fabric web on the outer side. The cover film is provided with an imprint on a print side, wherein the cover film is therefore laminated, in particular, extrusion-laminated, with the plastic-fabric web in such a way that the print side faces a second side of the plastic-fabric web. The imprint is then situated on the inside in the plastic fabric-film composite formed in this way and is visible through the cover and decorative film. The imprint is therefore to be applied in a reverse printing.

The plastic-fabric web comprising the film-strip fabric usually has a mass per unit area between 40 $g/m^2$ (grams per square meter) and 80 $g/m^2$, in particular between 50 $g/m^2$ and 70 $g/m^2$.

The film-strip fabric comprises plastic strips that are interwoven in such a way as to cross over one another and are usually formed from oriented polypropylene. The width of the individual strips is typically between 1 mm and 10 mm, for example approximately 3 mm.

The extruded-film web typically has a thickness between 25 μm and 90 μm, in particular, between 30 μm and 80 μm. Due to the blown-film web, further functions such as a good barrier effect can be integrated into the plastic fabric-film composite, wherein the extruded-film web also can contribute to the stability of the composite.

A lamination layer, which optionally comprises multiple layers and has a thickness that is usually between 10 μm and 50 μm, in particular, between 15 μm and 40 μm, is produced during the lamination between the plastic-fabric web and the extruded-film web.

According to another embodiment, when the above-described cover and decorative film is provided, the film also can be situated, together with a corresponding lamination layer, on the opposite side of the plastic-fabric web. The thickness of such a cover and decorative film can be between 10 µm and 40 µm, for example, approximately 18 µm, wherein biaxially oriented polypropylene (BO-PP) is preferred as the material. Polyethylene terephthalate (PET), inter alia, also is an option.

A plastic fabric-film composite product is produced with the aid of the method according to the invention. In the method, even the composite web formed after the lamination of the plastic-fabric web with the extruded-film web is such a composite product.

In another embodiment, packaging bags comprising the sealing layer on an inner side of the bag are formed from sections of the composite web, wherein, due to folds and/or the sections lying on top of each other at overlap regions, edges of the sections lie on top of each other and are connected to each other by heat sealing.

Preferably, sealing layers are connected to each other in the overlap regions by means of heat sealing.

Within the scope of the invention, multiple variants are conceivable to form multiple packaging bags from the composite web. For example, individual sections can be initially separated from the composite web, wherein precisely one packaging bag is formed from each section. For that matter, multiple sections can be separated from the composite web, which are then formed into a packaging bag by connecting the sections.

In an embodiment, the composite web is initially reshaped into a tubular strand, from which the individual packaging bags are then separated.

The packaging bags are preferably formed having opposed front walls and side gussets connecting the front walls. A side-gusseted tube is initially formed from the composite web in a continuous process for this purpose, from which tube the individual packaging bags, which are still unfilled, are then separated. The integration into a form-fill-seal method (FFS method) also is possible.

According to one embodiment, the packaging bag is closed in a liquid-tight manner and preferably also in an air-tight manner, wherein the barrier function, which is optionally provided in the extruded-film web, takes effect. In a known manner, despite a design which is substantially air-tight and liquid-tight, a valve function also can be provided by appropriate incisions or separately situated valves, to avoid at least an overpressure in a closed packaging bag.

The subject matter of the invention also is a plastic fabric-film composite formed according to the above-described method. The plastic fabric-film composite comprises an extruded-film web, which is coextruded in multiple layers, and a plastic-fabric web comprising a film-strip fabric. The extruded-film web comprises a sealing layer on a first side, which forms an outer side of the composite, and is connected, on a second side, to a first side of the plastic-fabric web via an at least single-layered lamination layer. As described above, the coextruded blown-film web is coextruded in at least three layers with a barrier layer of EVOH or PA, wherein the barrier layer adjoins the sealing layer via a primer layer.

Finally, the subject matter of the invention also is a packaging bag comprising the above-described plastic fabric-film composite, wherein the sealing layer is situated on an inner side of the bag, and wherein at least one connecting seam is formed on the sealing layer using a heat-sealed seam. In this case, it is preferably provided that the structure of the film-strip fabric at the heat-sealed seam is unchanged. In order to form the sealing seam, the sealing layer is heated from the inside, e.g., by hot air nozzles, or also from the outside, e.g., by sealing jaws. In addition, it also is possible to bring about a sealing by ultrasound or by a high-frequency welding method. When a high-frequency welding method is utilized, it is particularly significant that the sealing materials have a sufficiently high dielectric loss factor. EVA, for example, is suitable for this purpose.

BRIEF DESCRIPTION OF THE DRAWINGS

Further features and advantages of the invention will become apparent from the description of embodiments that follows, with reference to the attached figures, wherein.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
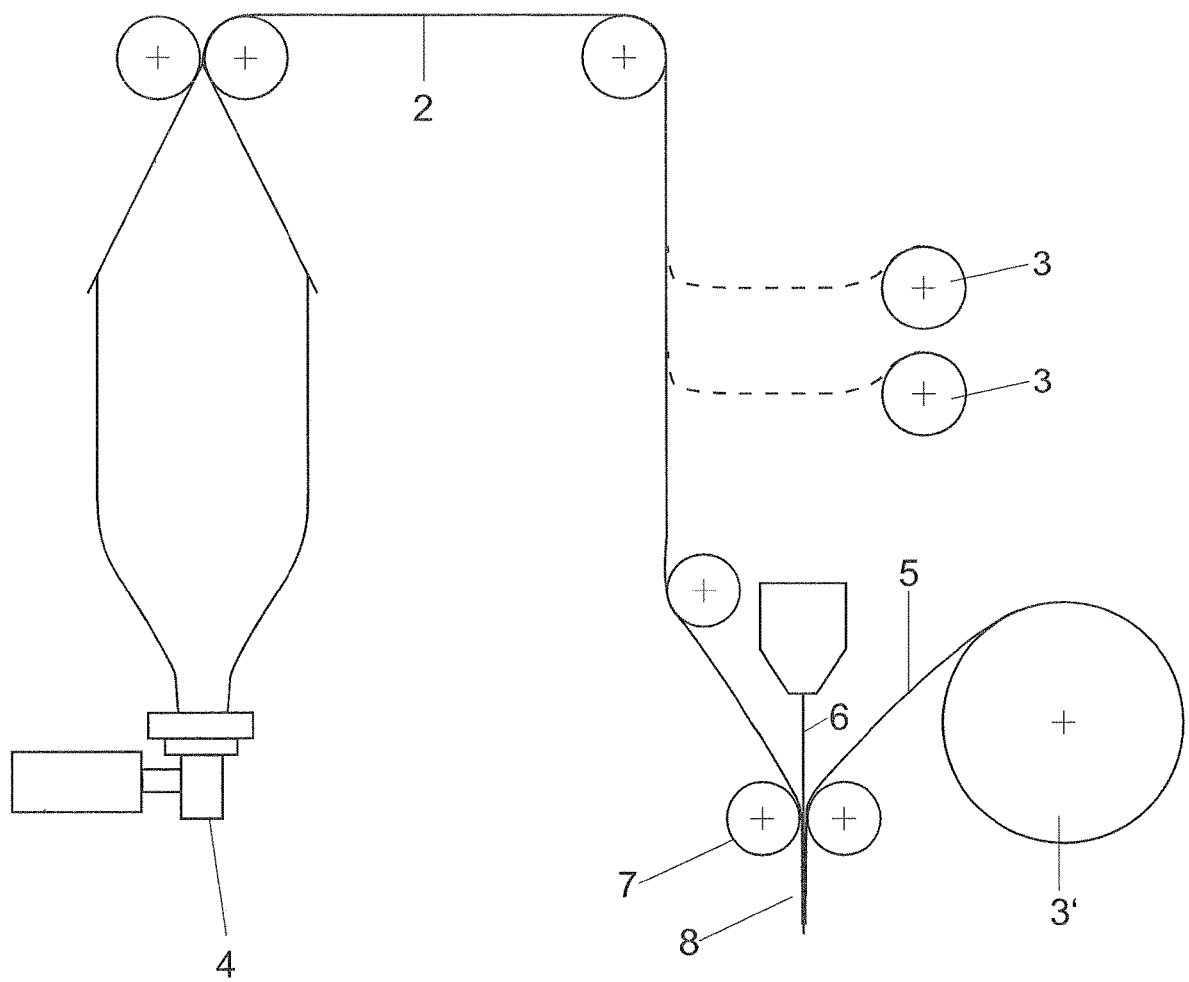
FIG. 1 is a schematic representation of a system for manufacturing a plastic fabric-film composite product, according to the invention.
Figure 2:
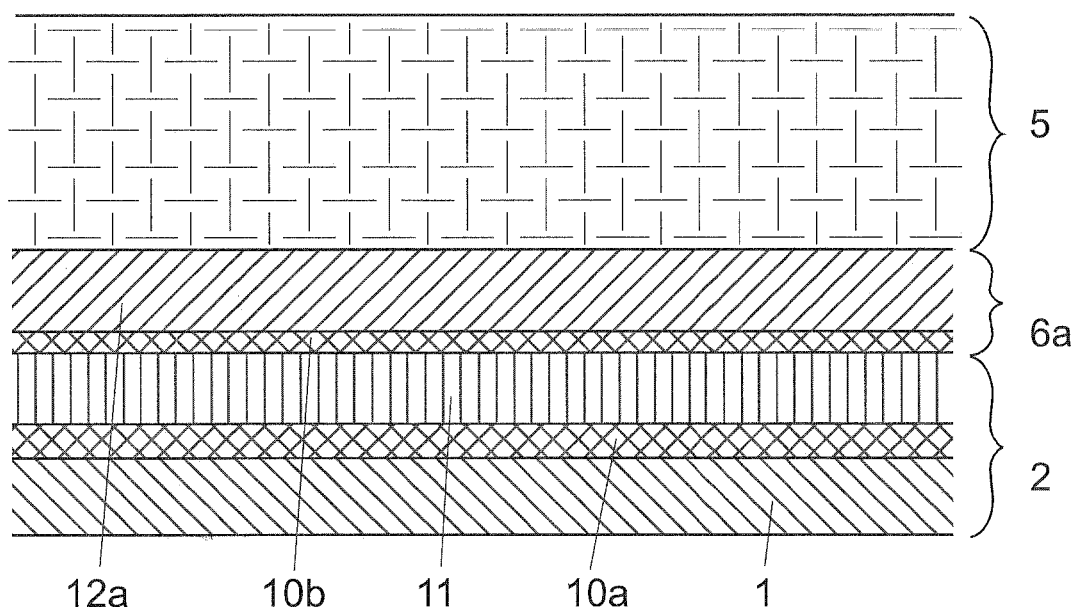
FIG. 2 depicts a layered design for an embodiment of a plastic fabric-film composite according to the invention.
Figure 3:
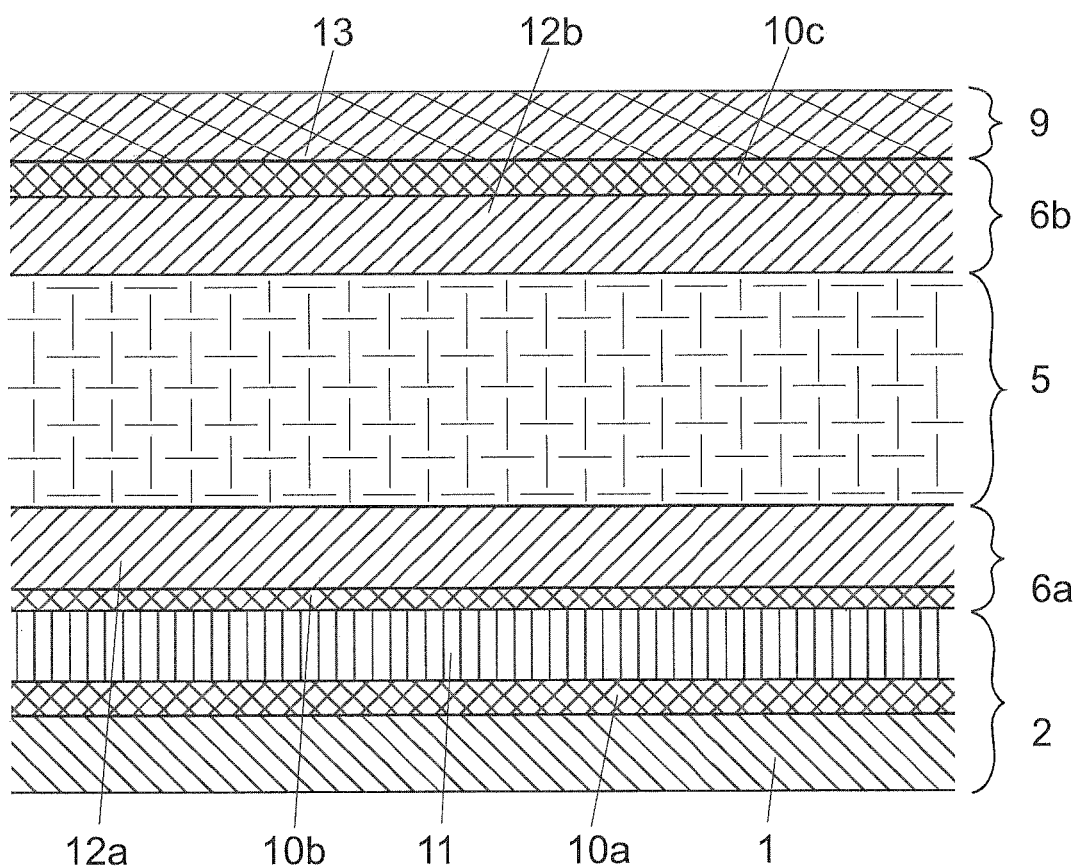
FIG. 3 depicts a layered design for an alternative embodiment of a plastic fabric-film composite according to the invention.

FIG. 1 shows, in a purely schematic representation, a system for manufacturing a plastic fabric-film composite product, wherein the steps of the method according to the invention are to be described with reference to the system. FIGS. 2 and 3 reflect an exemplary layered designs of the plastic fabric-film composite.

In order to manufacture the plastic fabric-film composite product, an extruded-film web comprising at least one sealing layer 1 is formed as a blown-film web 2 using blown-film extrusion, such that a sealing layer 1 is located on a first side of the blown-film web 2. As shown in FIGS. 2 and 3, the blown-film web is preferably coextruded in multiple layers. During the production of the blown-film web 2, the web is initially expanded immediately after extrusion and is then laid flat, in a cooled state, according to known methods. A bubble formed by the blown-film web 2 is cut open in this case. After the blown-film web 2 is produced, the web is initially rolled onto rolls 3, which are only schematically indicated in FIG. 1. The blown-film web 2 is then withdrawn from the rolls 3 for further processing.

To simplify the representation, FIG. 1 shows a variant in which the cooled and laid-flat blown-film web 2 is immediately fed to a further processing, even though the web is initially rolled up and unrolled in practical use. With respect to the blown-film extrusion, a conventional blown-film system 4 is schematically indicated in FIG. 1.

The prefabricated blown-film web 2, after having been manufactured and preferably after having been stored on a roll 3, is fed together with a plastic-fabric web 5, wherein the blown-film web 2 and the plastic-fabric web 5 are connected, by extrusion lamination, via a molten lamination layer 6a in the gap between a roller pair 7.

As described in greater detail in the following, the blown-film web 2 and the plastic-fabric web 5 are laminated with each other in such a way that the sealing layer 1 forms an outer layer of the composite web 8 on a first side of the blown-film web 2, while the blown-film web 2 is connected, at a second side, to the plastic-fabric web 5 via the lamination layer 6a.

In the exemplary embodiment according to FIG. 1, the plastic-fabric web 5 is rolled off a roll 3'. In this case, it can already be provided that the plastic-fabric web 5 has already been laminated with a cover film 9, which is situated on the composite web 8 on the outside, opposite the sealing layer 1.

FIG. 2 shows a preferred layered design of the plastic fabric-film composite formed in the method according to FIG. 1 comprising the composite web 8.

The plastic-fabric web 5 is formed from a film-strip fabric, wherein this fabric can have a mass per unit area, for example, between 50 g/m$^2$ and 70 g/m$^2$. The individual film strips, which are not represented further in the figures, are generally interwoven from stretched polypropylene having a width of typically approximately 3 mm in a vertical orientation.

According to the invention, the plastic fabric-film composite comprises a blown-film web 2 which, in the exemplary embodiment represented, is coextruded in three layers. A functional layer in the form of a barrier layer 11 adjoins the sealing layer 1, which is located on the outside in the composite web 8, via a primer layer 10a. The total thickness of the blown-film web 2 is typically between 30 μm and 80 μm, wherein EVOH and PA, in particular, are possible options as the material for the barrier layer 11, and polyolefins, in particular polyethylene, is a possible option for the sealing layer 1.

As shown in FIG. 2, the lamination layer 6a is in the form of two layers and adjoins the barrier layer 11 of the blown-film web 2 via a primer layer 10b and adjoins the plastic-fabric web 5 via a connecting layer 12a comprising polypropylene. The thickness of the lamination layer 6a is typically between 15 μm and 40 μm.

The represented design of the blown-film web 2 comprising the sealing layer 1, the primer layer 10a, and the barrier layer 11 in the layer sequence PE/HV/PA or EVOH is presented merely by way of example. In particular, within the scope of the invention, blown-film webs 2 comprising more than three layers are easily formed. The layered designs PE/HV/EVOH/HV/PE, PE/HV/PA/HV/PE, PE/HV/PA/EVOH/PA/HV/PE, for example, also are suitable.

FIG. 3 shows that the second side of the plastic-fabric web 5 situated at the top in the figures also can be laminated with a film, where the film then forms an outer cover film 9.

Biaxially oriented polypropylene (BO-PP) and polyethylene terephthalate (PET) also are possible options for use as the material. The thickness of the cover film 9 is typically between 10 μm and 40 μm. The cover film 9 can be provided with an imprint 13 in the direction of the plastic-fabric web 5, which imprint is situated on the inside, in a protected manner, on the composite web 8 that is formed.

The cover film 9 and the plastic-fabric web 5 are preferably connected to each other by extrusion lamination, for which a further lamination layer 6b is provided. As is similarly the case with the above-described lamination layer 6a, lamination layer 6b is designed having two layers, including a primer layer 10c and a connecting layer 12b.

Packaging bags can be formed from the plastic fabric-film composite, in the case of which the sealing layer 1 is located on an inner side of the bag. It is then also possible to heat-seal such a bag, wherein at least one connecting seam is formed on the sealing layer 1 by a heat-sealed seam without the structure of the film-strip fabric being adversely affected there.

For example, in the case of a side-gusseted bag, a back-side seam extending along the length of the bag is formed by hot air. A head and a base of the film bag is formed by heat-sealing, if necessary, wherein a stepped trimming of the front walls and of the side gussets are possible options for improving the closure.

Figure 4:
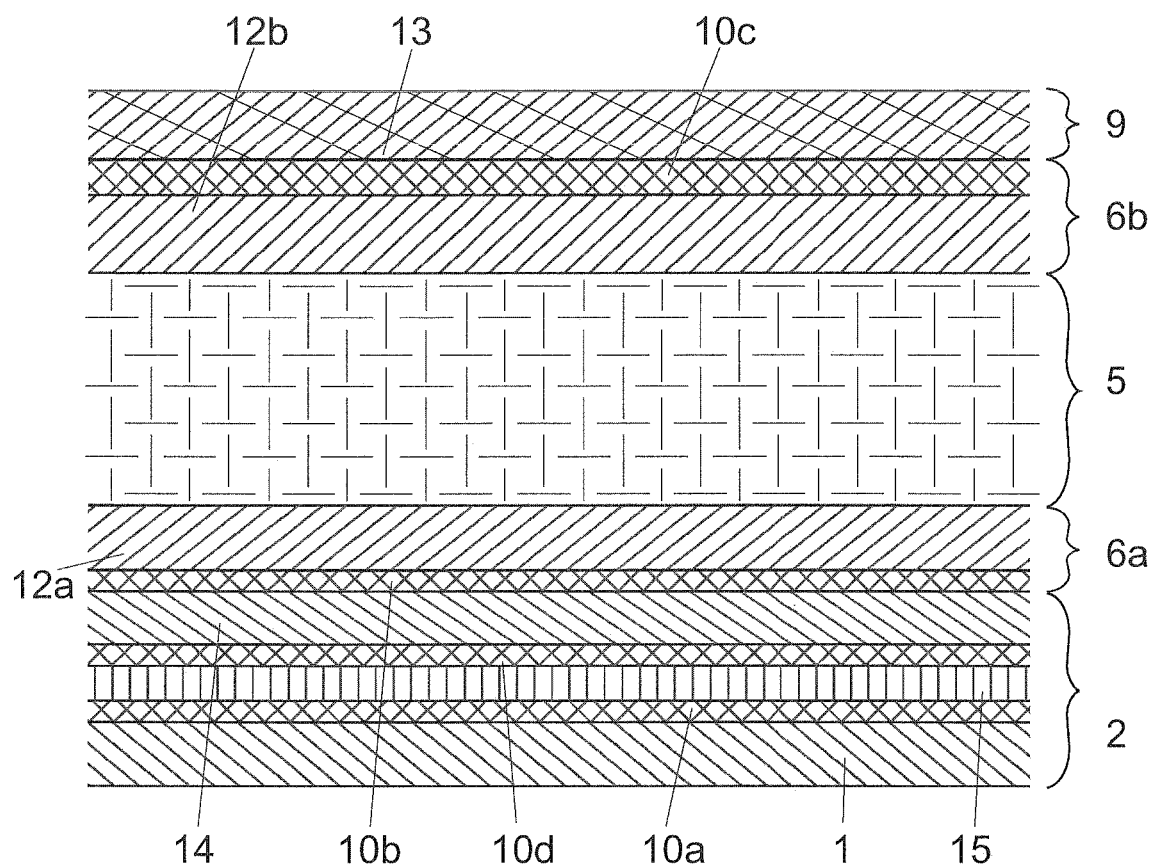
FIG. 4 depicts a layered design for an alternative embodiment of a plastic fabric-film composite according to the invention.

Proceeding from the plastic-fabric web according to FIG. 3, FIG. 4 shows a five-layered design of the blown-film web 2. The sealing layer 1 located on the outside in the composite web 8 is produced from polyethylene and has a layer thickness of 22 μm. A 6 μm-thick layer comprising EVOH adjoins the sealing layer 1 via a primer layer 10a having a layer thickness of 5 μm. A further polyethylene layer having a thickness of 22 μm is adjoined via a further 5 μm-thick primer layer 10d. The entire blown-film web 2 therefore has a layer thickness of 60 μm.

The blown-film web 2 is connected to the plastic-fabric web 5 via a lamination layer 6a. The lamination layer 6a consists of a connecting layer 12a, which preferably consists of polyethylene or a blend of polypropylene and polyethylene, and a primer layer 10b comprising Lotader®—a terpolymer. The connecting layer 12a preferably has a thickness of 28 μm, and the primer layer 10b has a thickness of 7 μm. The lamination layer 6a also adjoins the polyethylene layer 14 of the blown-film web 2 via the primer layer 10b and adjoins the plastic-fabric web 5 via the connecting layer 12a. In the example shown, the cover film 9 is preferably produced from polyethylene or oriented polypropylene (OPP) and typically has a thickness between 18 μm and 20 μm. The cover film 9 also is connected to the plastic-fabric web 5 via the lamination layer 6b, wherein the lamination layer 6b is either designed identically to the lamination layer 6a or has a layered design corresponding to one of the preceding examples.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A method for manufacturing a plastic fabric-film composite product, comprising the steps of:
   using film extrusion, forming an extruded-film web comprising at least one sealing layer so that the sealing layer is located on a first side of the extruded-film web, and
   forming a composite web by feeding and laminating to one another, a plastic-fabric web comprising a film-strip fabric and the extruded-film web so that a second side of the extruded-film web faces a first side of the plastic-fabric web, wherein the film-strip fabric comprises plastic strips that are interwoven so as to cross over one another.

2. The method as recited in claim 1, wherein the step of using film extrusion to form the extruded-film web is implemented by blown-film extrusion.

3. The method as recited in claim 1, wherein the step of using film extrusion to form the extruded-film web include coextruding the extruded-film web in multiple layers.

4. The method as recited in claim 3, wherein the extruded-film web comprises at least one barrier layer in addition to the sealing layer.

5. The method as recited claim 1, wherein the extruded-film web and the plastic-fabric web are connected to each other by extrusion lamination.

6. The method as recited in claim 1, wherein a cover film is provided with an imprint on a print side and wherein the cover film is laminated with the plastic-fabric web so that the print side of the cover film faces a second side of the plastic-fabric web.

7. The method as recited in claim 1, wherein the plastic-fabric web has a mass per unit area of between 40 g/m$^2$ and 80 g/m$^2$ and the extruded-film web has a thickness of between 25 μm and 90 μm, and wherein a lamination layer is formed during the lamination, the lamination layer having a thickness between 10 μm and 50 μm.

\* \* \* \* \*